United States Patent [19]

Numagami

[11] Patent Number: 5,155,774
[45] Date of Patent: Oct. 13, 1992

[54] APPARATUS AND METHOD FOR VERIFYING TRANSFORMATION COEFFICIENTS TO IDENTIFY IMAGE LOCATION

[75] Inventor: Hideo Numagami, Kanagawa, Japan

[73] Assignee: Kabushiki Kaisha Toshiba, Kanagawa, Japan

[21] Appl. No.: 632,930

[22] Filed: Dec. 24, 1990

[30] Foreign Application Priority Data

Dec. 26, 1989 [JP] Japan ................................ 1-335055

[51] Int. Cl.$^5$ ............................................. G06K 9/00
[52] U.S. Cl. ......................................... 382/1; 382/44; 382/48; 358/103
[58] Field of Search .................... 382/48, 45, 44, 1, 34, 382/30, 6; 358/103, 109; 342/64

[56] References Cited

U.S. PATENT DOCUMENTS

| | | | |
|---|---|---|---|
| 3,748,644 | 7/1973 | Tisdale | 340/149 A |
| 4,138,726 | 2/1979 | Girault et al. | 364/521 |
| 4,641,352 | 2/1987 | Fenster et al. | 382/6 |
| 4,876,651 | 10/1989 | Dawson et al. | 364/449 |
| 4,984,279 | 1/1991 | Kidney et al. | 382/1 |
| 5,034,812 | 7/1991 | Rawlings | 358/108 |

OTHER PUBLICATIONS

N. Sawada et al., "An Analytic Correction Method For Satellite MSS Geometric Distortions", Photogrammetric Engineering And Remote Sensing, vol. 47, No. 8, Aug. 1981, pp. 1195–1203.

*Primary Examiner*—Leo H. Boudreau
*Assistant Examiner*—Andrew W. Johns
*Attorney, Agent, or Firm*—Finnegan, Henderson, Farabow, Garrett and Dunner

[57] ABSTRACT

An image location identification apparatus extracts a first set of control point data for calculating transformation coefficient and a second set of control point data for verifying the transformation coefficient, from image data. According to global location data entered with the image data, a map corresponding to the image data is retrieved from the map database. A first part of the control point data for calculating transformation coefficient is selected from predetermined control points of the map, and all permutation of the first part of the control point data is formed. Then, the transformation coefficients are calculated according to the first set of control point data of the image data and each permutation of the first part of the control point data of the map. The transformation coefficients are verified by using the second set of control point data of the image data and the second part of the control point data of the map. Therefore according to the verification result, the image data matched with the map is displayed automatically and exactly.

23 Claims, 4 Drawing Sheets

APPARATUS AND METHOD FOR VERIFYING TRANSFORMATION COEFFICIENTS TO IDENTIFY IMAGE LOCATION

BACKGROUND OF THE INVENTION

1. Field of the Invention

The present invention relates to an image location identification apparatus for matching image data taken by an ITV with a corresponding map stored as data in a database.

2. Description of the Background

In the case of monitoring an urban area by using an ITV (imaging television camera) loaded in a helicopter, it is necessary for captured image data to be matched with a corresponding map, which may represent administrative district data or road data, on a display.

For example, when a fire breaks out, a fire spot is taken by an ITV from the sky. Then the image data and its global location data (latitude, longitude and angle direction of view) are sent to a host computer. At the host computer, a map corresponding to the image data is retrieved from a map data base, according to the global location data. And the image data is matched with the map, which includes houses, buildings and road data, on display. Therefore, according to the outbreak point of a fire, the path of a fire after a prescribed time is simulated on the map. Then, against the path simulation, lead way and refuge places for inhabitants are determined.

In such a case, because the image data is matched with the map by using only the global location data, an error of several hundred meters may take place between the image data and the map, which are matched on the display. Therefore, if exact location identification is necessary for the image data and the map, the user must designate control points on the image data and the map for geometrical correction. However, because image data are sent momentarily, the designation of control points interactively is troublesome for user. Furthermore, if the user is not familiar with the neighborhood, he can not designate control points on the display rapidly.

SUMMARY OF THE INVENTION

Accordingly, it is one object of the present invention to provide an image location identification apparatus which can identify the location between the image data and corresponding map exactly and rapidly.

It is another object of the present invention to provide an image location identification apparatus which can identify the location between the image data and corresponding map without user's designation of control points.

These and other objects of the present invention are accomplished by extraction from the image data a first set of control points for calculating transformation coefficients and a second set of control points for verifying the transformation coefficients. On the other hand, a first part of control points are extracted from predetermined control points of the map, and all permutation of the first part of control points are formed. Then, transformation coefficients are calculated according to the first set of control points of the image data and the permutation of the first part of control points of the map. And the transformation coefficient corresponding each permutation is verified by using the second set of control points of the image data and the second part of control points of the map. Therefore, according to the transformation coefficient which is verified to be correct, the image data is matched with the map on display exactly.

DESCRIPTION OF THE PREFERRED EMBODIMENTS

Figure 1:
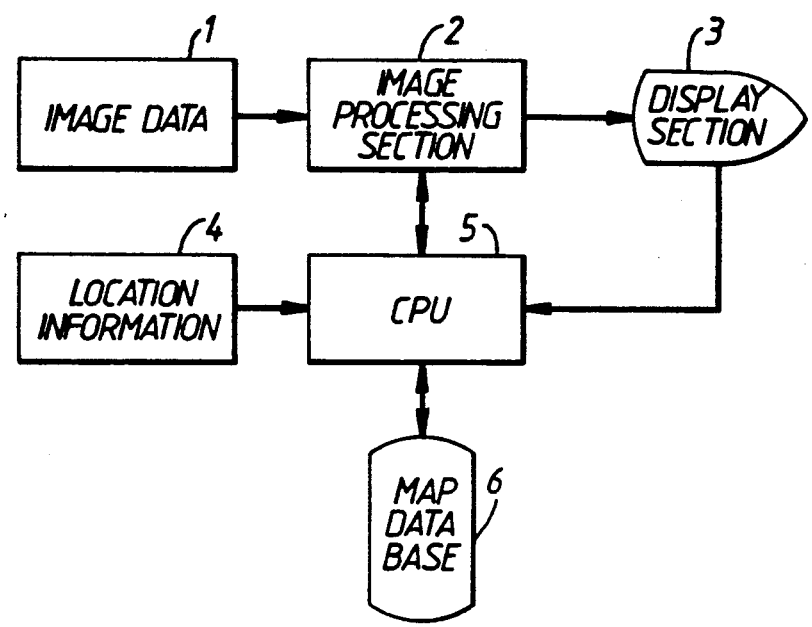
FIG. 1 shows a schematic of an image location identification apparatus of the present invention.

FIG. 1 shows the construction of an image location identification apparatus according to the present invention. Image data 1 is a video signal which is taken by an ITV loaded in a helicopter. Image processing section 2 quantizes 512×512 pixels for the image data 1 and stores them. Then the section 2 extracts control points for location identification from quantized image data, under the control of CPU 5. Location information 4 is global location data such as latitude, longitude and height measured by the global positioning system or inertial navigation system of the helicopter. The location information 4 also includes camera parameters as direction and angle of view. Map database 6 is memorized maps of the monitor area, which have global location data as latitude and longitude for retrieval, respectively. Each map also includes figure data of roads, buildings, houses and many control points for location identification. CPU 5 controls all other sections 1, 2, 3, 4, 6 and CPU 5 retrieves a map corresponding to the image data 1 from the map data base 6, according to the location information 4. Then CPU 5 identifies the location between the image data 1 and the retrieved map, according to predetermined control points of the retrieved map and control points of the image data extracted by the image processing section 2. Lastly CPU 5 makes the image data 1 match with the map on display section 3.

Figure 2:
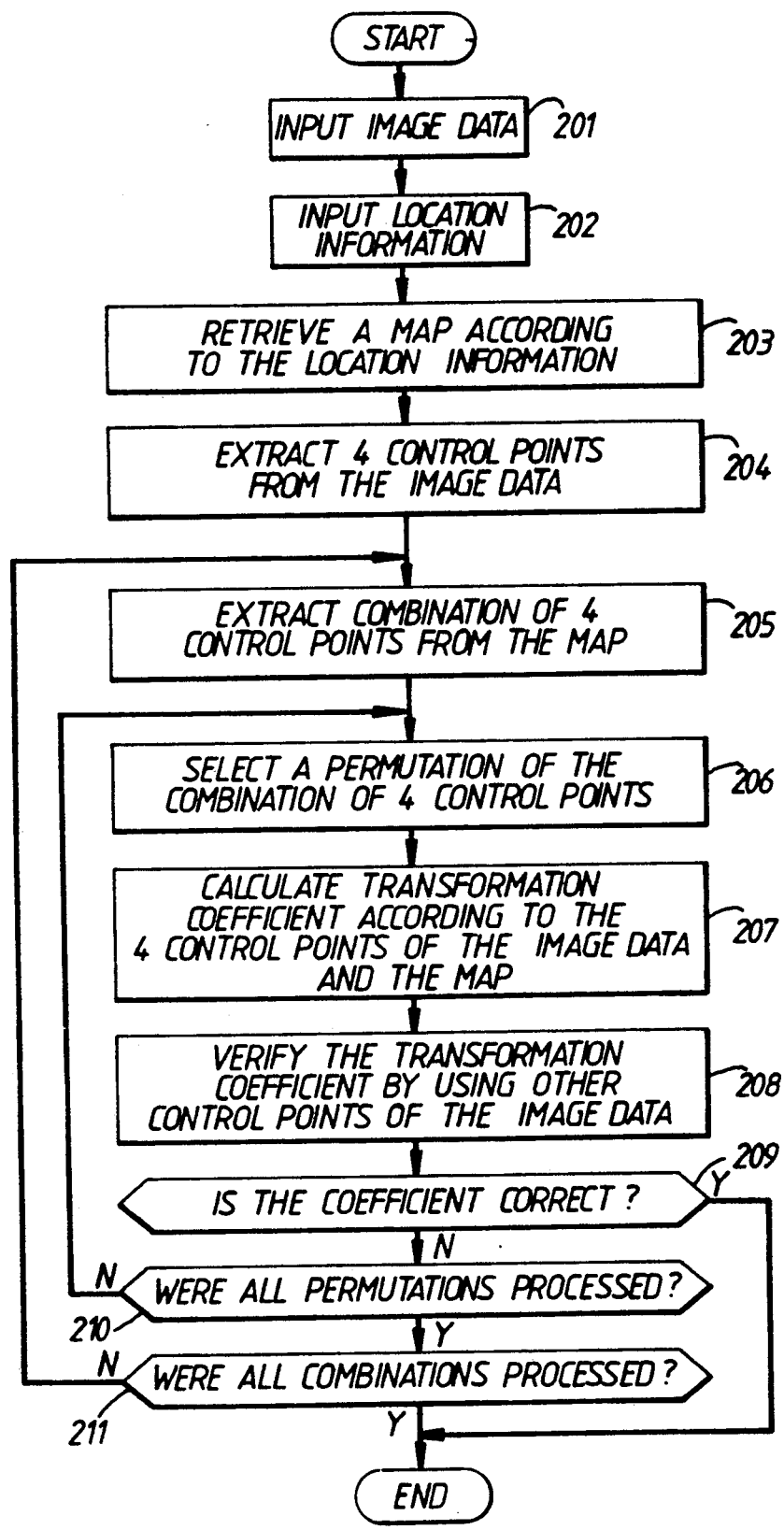
FIG. 2 shows a flow chart of the process for identifying image location to the present invention.

FIG. 2 shows a flow chart of the process for identifying image location. Firstly, image data 1 is quantized and stored in the image processing section 2 (step 201). Next, according to the location information 4, a map area corresponding to the image data 1 is calculated and the map is retrieved, having area to spare (for example, 200 m extra width in direction of top and bottom and left and right). (step 202, 203).

Figure 3:
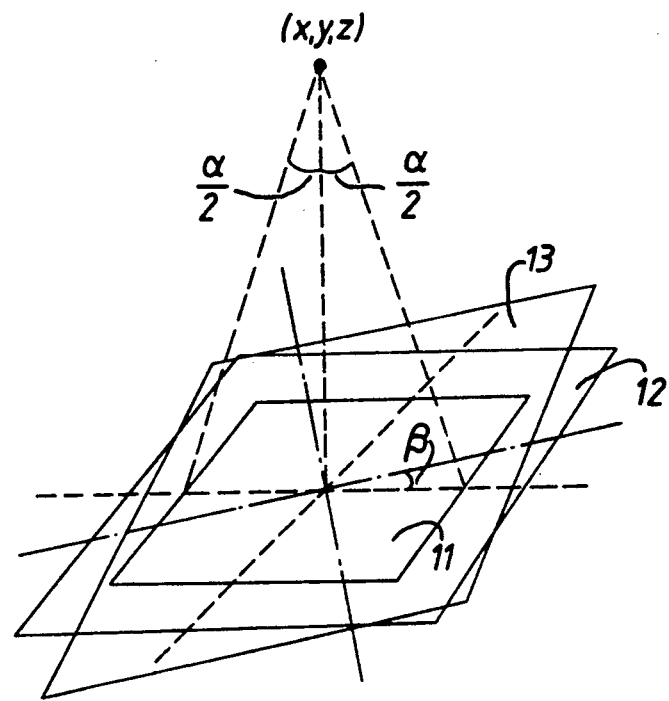
FIG. 3 shows an example of the map area corresponding to the image data.

The calculation of map area or map database 6 is explained, assuming that the latitude, longitude, and height of photographing position are X, Y, Z and angle direction of camera view are α, β, which is taken in the vertical direction. As shown in FIG. 3, first area 11 in direction "O" is calculated according to X, Y, Z and α. Second, area 12 which includes an admissible error limit against the area 11 is calculated. Finally, area 13 which is the area 12 rotated in direction is calculated on the map database 6.

Next, as control points for location identification, cross points of main roads are extracted (step 204). The colors and configurations of roads are different from that of buildings, parks, space or green zones and so on. Therefore, roads, as regions having characteristics of a predetermined color and configuration are extracted. Then, the central line of each road is extracted and the cross point between two central lines is extracted as a control point. In this case, it is not necessary for all road regions and all cross points to be extracted, and a minimum number of road regions and cross points for location identification may be extracted.

Figure 4:
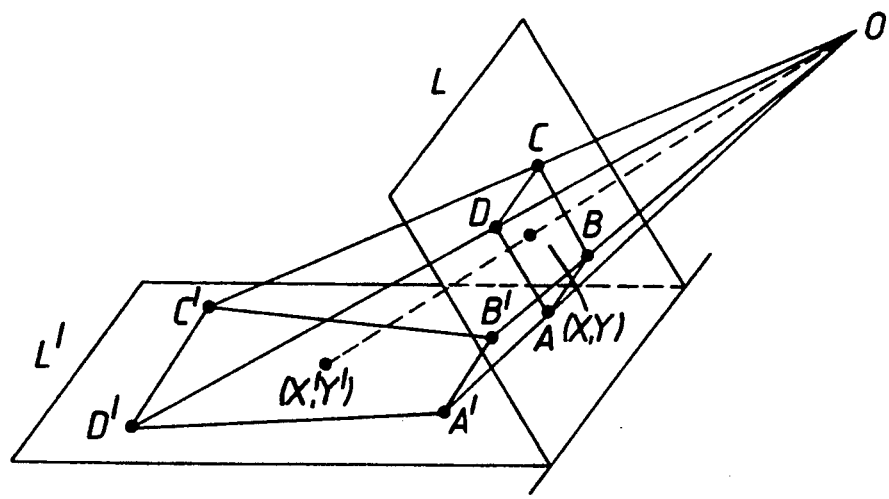
FIG. 4 shows on explanatory example of the formula of coordinate transformation used for identifying location between the image data and the map.

Coordinate transformation for location identification is represented as a secondary formula or projective transformation, if the control points are situated on same plane. Namely, if a narrow area is taken by ITV, the ground surface is regarded as a plane. Therefore, as shown in FIG. 4, it assumes that image data plane taken by ITV is L and the retrieval map plane is L'. Point (X', Y') on the plane L' corresponding to a projection of central point (X, Y) on the Plane L is calculated by using the following formula:

$$X' = (b1X + b2Y + b3)/(b7X + b8Y + 1)$$

$$Y' = (b4X + b5Y + b6)/(b7X + b8Y + 1)$$

Coefficients b1-b8 in the above transformation formula are calculated from at least four control points of the image data 1 and the retrieval map. In FIG. 4, four control points of the image data L are A, B, C, D and four control points of the retrieval map L' are A', B', C', D'.

Figure 5:
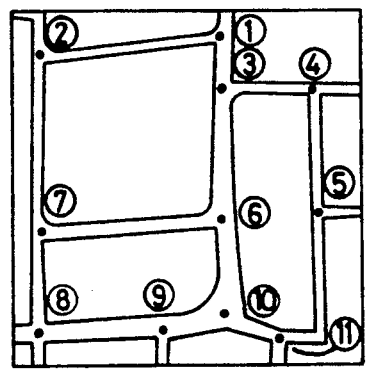
FIG. 5 shows an example of control points of the image data.
Figure 6:
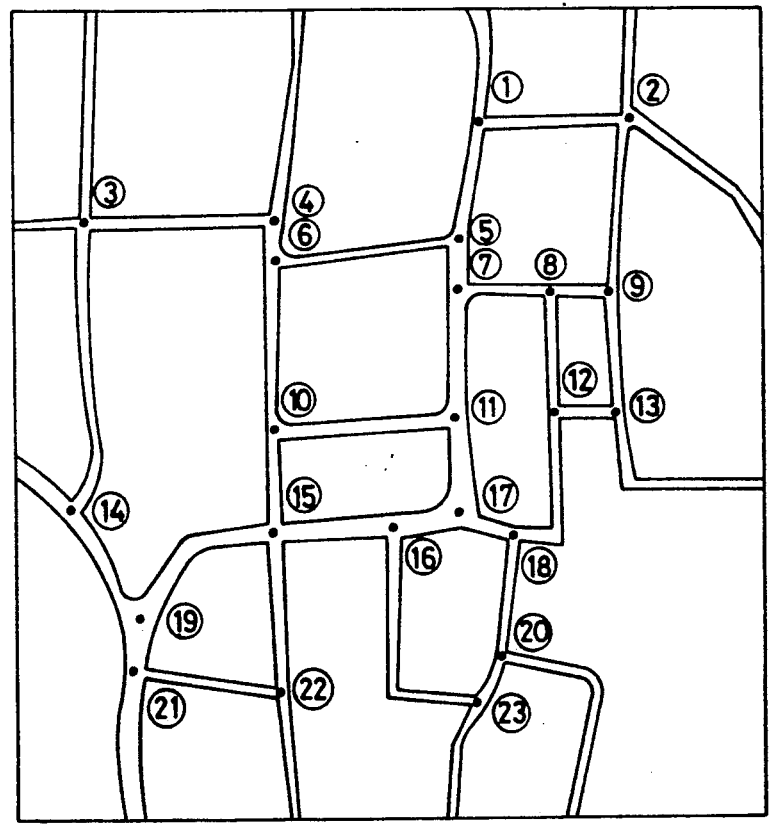
FIG. 6 shows an example of predetermined control points of the map.

As shown in FIG. 5, eleven control points are extracted in image data 1. From the eleven control points, four control points which are distributed all over the image data 1 are extracted as the control points for calculating transformation coefficients. In FIG. 5, four control points (2, 4, 8, 11), for which the sum of mutual distances between the four control points is maximum, are the ones used for calculating the transformation coefficients and the other seven control point (1, 3, 5, 6, 7, 9, 10) are used for verifying the transformation coefficients. As shown in FIG. 6, twenty-three control points are registered in advance in the retrieval map. From the control points 1-23, four control points are selected in order (step 205). And all permutations of the selected four control points are formed. As for the first permutation (step 206), transformation coefficients between the coordinate systems of the image data and the map are calculated, by using four control points (2, 4, 8, 11) of the image data and the first permutation of the selected four control points of the map (step 207). Then, by using the transformation coefficients, coordinate points corresponding to the other control points (1,3,5,6,7,9,10) of the image data are calculated on the map and it is determined whether the predetermined control points are situated near the coordinate points on the map (step 208). If the predetermined control points are situated near all of the coordinate points on the map respectively, the transformation coefficients are correct (step 209). Therefore, according to the corresponding control points, the image data is matched with the map on the display section 3. However, if the predetermined control points are not situated near all of the coordinate points on the map, respectively, the transformation coefficients are not correct. Therefore, using a second permutation of the selected four control points, the above-mentioned processing (step 207, 208, 209) is repeated (step 210). If the transformation coefficients are not correct for any of the permutations of the selected four control points, another four control points are selected from the control points 1-23 on the map (step 211). As for the second selected four control points, the above-mentioned processing (step 206, 207, 208, 209, 210) is repeated. This process is repeated until a correct set of transformation coefficients are found, with a different four control points selected in turn and the above-mentioned processing being repeated.

In FIG. 6, first four control points (1, 2, 3, 4,) are selected from predetermined control points 1-23. All permutation of the first four control points are (1, 2, 3, 4) (1, 2, 4, 3) (1, 3, 2, 4) (1, 3, 4, 2) (1, 4, 2, 3) (1, 4, 3, 2) (2, 1, 3, 4) (2, 1, 4, 3) (2, 3, 1, 4) (2, 3, 4, 1) (2, 4, 1, 3) (2, 4, 3, 1) (3, 1, 2, 4) ) (3, 1, 4, 2 ) (3, 2, 1, 4) (3, 2, 4, 1) (3, 4, 1, 2) ( 3, 4, 2, 1) ( 4, 1, 2, 3) (4, 1, 3, 2) (4, 2, 1, 3) (4, 2, 3, 1) (4, 3, 1, 2) (4, 3, 2, 1 ). Then, transformation coefficients for each permutation of the four control points (2, 4, 8, 11) of the image data (as shown in FIG. 5) are calculated, taking account of the control points order. In this case, since the transformation coefficients for all permutations are not correct, the second four control points (1, 2, 3, 5) are selected from predetermined control points 1-23 of the map. All permutations of the second four control points (1, 2, 3, 5) are formed and the transformation coefficients are calculated for all permutations. In this way, when the same permutation of four control points (6, 8, 15, 18) from the map (as shown in FIG. 6) is selected, the transformation coefficients are correct. In short, the transformation coefficients between the four control points (6, 8, 15, 18) on the map and the four control points (2, 4, 8, 11) on the image data are calculated. According to these transformation coefficients, coordinate points corresponding to control points (1, 3, 5, 6, 7, 9, 10) for verifying on the image data are situated just as predetermined control points (5, 7, 10, 11, 12, 16, 17) on the map.

Lastly, by using corresponding control points in the the image data and the map, the image data is matched with the map automatically. When the image data and the map are matched, they are displayed on the display section 3.

What is claimed is:

1. An image location identification apparatus, comprising:

an image input means for entering image data and corresponding global location data;

map memory means for storing a plurality of maps, with each map having global location data and control point data;

retrieval means for retrieving from the map memory means, a stored map whose global location data coincide with the global location data of the image data;

extracting means for extracting from the image data, a first set of control point data for calculating a transformation coefficient and a second set of control point data for verifying the transformation coefficient, wherein control point data of the image data comprises the first set of at least four control point data for calculating transformation coefficients and the second set of other control point data for verifying the transformation coefficient;

calculating means for calculating transformation coefficients of the image data and the map, by using the first set of control point data of the image data and a first part of the control point data of the map, wherein the calculating means selects a first part of at least four control point data from the control point data of the map and forms all permutations of the first part of the control point data; and verification means for verifying the transformation coefficients, according to the second set of control point data of the image data and a second part of the control point data of the map.

2. The image location identification apparatus according to claim 1, wherein the calculating means calculates coordinate point data corresponding to the second set of control point data of the image data by using the transformation coefficients.

3. The image location identification apparatus according to claim 2, wherein the verification means determines if the coordinate point data are situation within a predetermined limit of the second part of the control point data of the map.

4. The image location identification apparatus according to claim 3, wherein the extraction means selects a different first set of the control point data from the map and the calculation means forms all permutations of the different first set of the control point data when the coordinate point data are not situated within said predetermined limit of the second part of the control point data of the map.

5. The image location identification apparatus according to claim·4, further comprising display means for displaying the image data when the coordinate point data are situated within said predetermined limit of the second part of the control point data of the map.

6. An image location identification apparatus, comprising:

an image input means for entering image data and corresponding global location data;

map memory means for storing a plurality of maps, with each map having global location data and control point data;

retrieval means for retrieving from the map memory means, a stored map whose global location data coincide with the global location data of the image data;

extracting means for extracting from the image data, a first set of control point data for calculating a transformation coefficient and a second set of control point data for verifying the transformation coefficient, wherein control point data of the image data comprises the first set of at least four control point data for calculating transformation coefficients and the second set of other control point data for verifying the transformation coefficient and the first set of control point data are selected so that the sum of the mutual distance among the at least four control points is a maximum;

calculating means for calculating transformation coefficients of the image data and the map, by using the first set of control point data of the image data and a first part of the control point data of the map; and verification means for verifying the transformation coefficients, according to the second set of control point data of the image data and a second part of the control point data of the map.

7. A method of identifying image location comprising the steps of:

entering image data and corresponding global location data;

memorizing a plurality of maps, with each map having global location data and control point data;

retrieving from said plurality of maps, a memorized map whose global location data coincide with the global location data of the image data;

extracting from the image data a first set of control point data, having at least four control point data, for calculating a transformation coefficient and a second set of control point data for verifying the transformation coefficient;

calculating transformation coefficients of the image data and the map, by using the first set of control point data for the image data and a first part of the control point data of the map;

verifying the transformation coefficients, according to the second set of control point data of the image data and a second part of the control point data of the map;

wherein the calculating step includes the steps of
selecting a first part of at least four control point data from the control point data of the map; and
forming all permutations of the first part of the control point data.

8. The method of identifying image location according to claim 7, wherein the calculating step includes the step of:

calculating coordinate point data corresponding to the second set of the control point data from the image data, by using the transformation coefficients.

9. The method of identifying image location according to claim 8, wherein the verifying step includes the step of:

determining if the coordinate point data are situated within a predetermined limit of a second part of control point data of the map.

10. The method of identifying image location according to claim 9, further comprising the steps of:

selecting a different first part of the control point data from the map when the coordinate point data are not situated within said predetermined limit of the second part of the control point data of the map; and forming all permutations of the different first part of the control point data; and repeating said steps of calculating, verifying, and selecting a different first set until the coordinate point data are situated within said predetermined limit of the second part of the control point data of the map.

11. The method of identifying image location according to claim 10, further comprising the step of displaying the image data when the coordinate point data are situated within said predetermined limit of the second part of the control point data of the map.

12. A method of identifying image location comprising the steps of:

entering image data and corresponding global location data;

memorizing a plurality of maps, with each map having global location data and control point data;

retrieving from said plurality of maps, a memorized map whose global location data coincide with the global location data of the image data;

extracting from the image data a first set of control point data, having at least four control point data, for calculating a transformation coefficient and a second set of control point data for verifying the transformation coefficient, wherein the first set of control point data are selected so that the sum of the mutual distance among the at least four control point data is a maximum;

calculating transformation coefficients of the image data and the map, by using the first set of the control point data for the image data and a first part of the control point data of the map;

verifying the transformation coefficients, according to the second set of control point data of the image data and a second part of the control point data of the map.

13. An image location identification apparatus comprising:

an image input means for entering image data representing a first angle of view and corresponding global location data;

map memory means for storing a plurality of maps, with each map having global location data and control point data representing a second angle of view;

retrieval means for retrieving from the map memory means, a stored map whose global location data coincide with the global location data of the image data; and means for transforming said image data representing said first angle of view to image data representing said second angle of view, wherein said transforming means comprises:

extracting means for extracting first and second sets of control point data from the image data, wherein said first and second sets of control point data each comprise at least four data points;

calculating means for calculating transformation coefficients of the image data and the map, by using the first set of control point data of the image data and a first part of the control point data of the map, wherein the calculating means selects the first part of the control point data of the map including at least four data points and forms all permutations of the first part of the control point data; and verification means for verifying the transformation coefficients, according to the second set of control point data of the image data and a second part of the control point data of the map.

14. The image location identification apparatus according to claim 13, wherein the calculating means calculates coordinate point data corresponding to the second set of control point data of the image data by using the transformation coefficients.

15. The image location identification apparatus according to claim 14, wherein the verification means determines if the coordinate point data are situated within a predetermined limit of a second part of the control point data of the map.

16. The image location identification apparatus according to claim 15, wherein the extraction means selects a different first set of control point data from the map and the calculation means forms all permutations of the different first set of the control point data when the coordinate point data are not situated within said predetermined limit of the second part of the control point data of the map.

17. The image location identification apparatus according to claim 16, further comprising display means for displaying the image data when the coordinate point data are situated within said predetermined limit of the second part of the control point data of the map.

18. A method of identifying image location comprising the steps of:

entering image data representing a first angle of view and corresponding global location data;

storing a plurality of maps, with each map having global location data and control point data;

retrieving from said plurality of maps, a stored map representing a second angle of view and whose global location data coincide with the global location data of the image data;

transforming said image data representing said first angle of view to image data representing said second angle of view, wherein said transforming step comprises the steps of:

extracting from the image data a first set of control point data for calculating a transformation coefficient and a second set of control point data for verifying the transformation coefficient;

calculating transformation coefficients of the image data and the map, by using the first set of control point data for the image data and a first part of the control point data of the map, wherein the calculating step includes the steps of:

selecting a first part of the control point data of the map including at least four data points;

forming all permutations of the first part of the control point data; and verifying the transformation coefficients, according to the second set of control point data of the image data and a second part of the control point data of the map.

19. The method of identifying image location according to claim 18, wherein the calculating step includes the step of:

calculating coordinate point data corresponding to the second set of control point data from the image data, by using the transformation coefficients.

20. The method of identifying image location according to claim 19, wherein the verifying step includes the step of:

determining if the coordinate point data are situated within a predetermined limit of a second part of control point data of the map.

21. The method of identifying image location according to claim 20, further comprising the steps of:

selecting a different first part of the control point data from the map when the coordinate point data are not situated within said predetermined limit of the second part of the control point data of the map; and forming all permutations of the different first part of the control point data; and repeating said steps of calculating, verifying, and selecting a different first set until the coordinate point data are situated within said predetermined limit of the second part of the control point data of the map.

22. The method of identifying image location according to claim 21, further comprising the step of displaying the image data when the coordinate point data are situated within said predetermined limit of the second part of the control point data of the map.

23. A method of identifying image location comprising the steps of:

entering image data representing a first angle of view and corresponding global location data;

storing a plurality of maps, with each map having global location data and control point data;

retrieving from said plurality of maps, a stored map representing a second angle of view and whose global location data coincide with the global location data of the image data; and transforming said image data representing said first angle of view to image data representing said second angle of view, wherein said transforming step comprises the steps of:

extracting from the image data a first set of control point data for calculating a transformation coefficient and a second set of control point data for verifying the transformation coefficient, wherein the first set of control point data are selected so that the sum of the mutual distance among the four control points is a maximum;

calculating transformation coefficients of the image data and the map, by using the first set of control point data for the image data and a first part of the control point data of the map; and verifying the transformation coefficients, according to the second set of control point data of the image data and a second part of the control point data of the map.

* * * * *